United States Patent
Yi et al.

(10) Patent No.: US 9,680,725 B2
(45) Date of Patent: Jun. 13, 2017

(54) METHOD AND APPARATUS FOR MEASURING A PACKET THROUGHPUT IN WIRELESS COMMUNICATION SYSTEM

(71) Applicant: LG Electronics Inc., Seoul (KR)

(72) Inventors: Seung June Yi, Seoul (KR); Sung Hoon Jung, Seoul (KR); Young Dae Lee, Seoul (KR); Sung Jun Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/019,517

(22) Filed: Feb. 9, 2016

(65) Prior Publication Data

US 2016/0173355 A1 Jun. 16, 2016

Related U.S. Application Data

(63) Continuation of application No. 13/943,498, filed on Jul. 16, 2013.

(Continued)

(51) Int. Cl.
*H04L 12/26* (2006.01)
*H04W 24/02* (2009.01)
(Continued)

(52) U.S. Cl.
CPC ......... *H04L 43/0888* (2013.01); *H04W 24/02* (2013.01); *H04W 24/08* (2013.01); *H04W 28/0278* (2013.01)

(58) Field of Classification Search
CPC .................................................. H04L 43/0888
See application file for complete search history.

(56) References Cited

U.S. PATENT DOCUMENTS 6,473,399 B1  10/2002  Johansson et al.
6,615,050 B1   9/2003  Tiedemann, Jr. et al.
(Continued)

FOREIGN PATENT DOCUMENTS

CN  101765118 A  6/2010
CN  102006620 A  4/2011

OTHER PUBLICATIONS

R2-102068, Huawei, "Throughput Measurement", 3GPP TSG-RAN WG2 #69bis, Apr. 12-16, 2010, Beijing, China.*

(Continued)

*Primary Examiner* — Andrew Lai
*Assistant Examiner* — Chuong M Nguyen
(74) *Attorney, Agent, or Firm* — Dentons US LLP

(57) ABSTRACT

A method and apparatus of measuring a packet throughput in a wireless communication system are provided. When determining a reference time for estimating packet throughput, a receiver determines the time that a data burst starts or ends in order to estimate the packet throughput considering a change in the data burst of the transmitter buffer. A measurement period is defined through the determined start time and end time of the data burst, and packet throughput is measured considering the total amount of the received data burst. The throughput of packet data may be estimated by each base station based on the same standard rule, so that the measured packet throughput values may be reliable, thus allowing the operator to make use of it as a parameter for MDT.

10 Claims, 16 Drawing Sheets

Related U.S. Application Data

(60) Provisional application No. 61/672,725, filed on Jul. 17, 2012.

(51) Int. Cl.
*H04W 24/08* (2009.01)
*H04W 28/02* (2009.01)

(56) References Cited

U.S. PATENT DOCUMENTS

| | | |
|---|---|---|
| 2005/0289395 A1 | 12/2005 | Katsuyama et al. |
| 2008/0192623 A1 | 8/2008 | Chen |
| 2008/0276281 A1 | 11/2008 | Ogawa et al. |
| 2009/0086671 A1 | 4/2009 | Pelletier et al. |
| 2009/0219951 A1 | 9/2009 | Chun et al. |
| 2009/0232054 A1 | 9/2009 | Wang et al. |
| 2009/0274098 A1 | 11/2009 | Chun et al. |
| 2010/0002724 A1 | 1/2010 | Turlington et al. |
| 2010/0091728 A1 | 4/2010 | Kim et al. |
| 2010/0130216 A1 | 5/2010 | Harada et al. |
| 2010/0255784 A1 | 10/2010 | Ido |
| 2011/0026400 A1 | 2/2011 | Harrand et al. |
| 2011/0149763 A1 | 6/2011 | Bae |
| 2011/0194441 A1 | 8/2011 | Jung et al. |
| 2011/0195668 A1 | 8/2011 | Lee et al. |
| 2011/0222417 A1 | 9/2011 | Watanabe |
| 2011/0222431 A1 | 9/2011 | Oue et al. |
| 2012/0063449 A1 | 3/2012 | Frederic et al. |
| 2012/0076059 A1 | 3/2012 | Wu |
| 2012/0092998 A1 | 4/2012 | Chang et al. |
| 2012/0108241 A1 | 5/2012 | Wu |
| 2012/0300629 A1 | 11/2012 | Drucker |
| 2013/0007789 A1 | 1/2013 | Wang et al. |
| 2013/0084809 A1* | 4/2013 | Johansson ............ H04W 24/08 455/67.11 |
| 2013/0114446 A1* | 5/2013 | Liu ........................ H04W 24/10 370/252 |
| 2013/0130627 A1 | 5/2013 | Fukuta |
| 2013/0182583 A1 | 7/2013 | Siomina et al. |
| 2014/0195596 A1 | 7/2014 | Yamasaki et al. |

OTHER PUBLICATIONS

LG Electronics Inc.: "Throughput and loss rate measurements for MDT QoS verification", 3GPP TSG-RAN WG2 Meeting #77, R2-120665, Feb. 6-10, 2012.

Huawei, HiSilicon: "Discussion on MDT Throughput Measurement for UMTS", 3GPP TSG-RAN WG2 #77b, R2-121370, Mar. 26-30, 2012.

Ericsson: "Define PDCP Throughput measurements", 3GPP TSG-SA5 (Telecom Management), S5-093472, Aug. 31-Sep. 4, 2009.

U.S. Appl. No. 13/943,498, filed Jul. 16, 2013.

3GPP TS 36.314 (V10.2.0), "3rd Generation Partnership Project; Technical Specification group Radio Access Network; Evolved Universal Terrestrial Radio Access (E-UTRA), Layer 2—Measurements (Release 10)", Sep. 2011.

MediaTek,"[76#33] MDT Scheduled IP Throughput measurement", 3GPP TSG RAN WG2 meeting #77, R2-12C625, Dresden, Germany, Feb. 2012.

LG Electronics, Inc.,"Throughput anc loss rate measurements for MDT QoS verification", GPP TSG RAN WG2 meeting #76, R2-116247, San Francisco, USA Nov. 2011.

* cited by examiner

FIG. 9

| Buffer Size #0 (910) | | Buffer Size #1 | Oct 1 |
| Buffer Size #1 (920) | Buffer Size #2 (930) | | Oct 2 |
| Buffer Size #2 | Buffer Size #3 (940) | | Oct 3 |

METHOD AND APPARATUS FOR MEASURING A PACKET THROUGHPUT IN WIRELESS COMMUNICATION SYSTEM

This application is a Continuation of U.S. application Ser. No. 13/943,498 filed Jul. 16, 2013, which claims the benefit of U.S. Provisional Application No. 61/672,725 filed Jul. 17, 2012, all of which are hereby incorporated by reference in their entirety.

TECHNICAL FIELD

The present invention relates to wireless communications, and more specifically, to a method and apparatus for measuring a throughput for a data burst in a wireless communication system.

BACKGROUND ART

Commercialization of next-generation wireless communication systems, such as LTE (Long Term Evolution) systems, is being recently accelerated. The LTE systems are spread more quickly as respond to users' demand for services that may support higher quality and higher capacity while ensuring mobility, as well as voice services. The LTE system provides for low transmission delay, high transmission rate and system capacity, and enhanced coverage.

Meanwhile, telecommunication service providers try to grasp how well the quality of service (QoS) of UE(User Equipment)s is guaranteed in the LTE environment so as to enhance service quality. Rather than the QoS of a bearer as ensured by an actual network, the QoS, as users feel, is verified, and as a result, a standardization-related conference recently held suggests UE QoS verification for minimization of drive test (MDT) as a scheme of verifying service quality.

The MDT is a technology for a telecommunication service provider to optimize, network parameters, using measurement results of UEs present in a cell, and for achieving the purpose of MDT, an operator has conventionally used a vehicle to move place-to-place in the cell so as to measure the quality of the cell. However, the recent MDT uses measurement results of commercial UEs present in the cell so that the operator may minimize time and costs necessary for network optimization. In other words, while the existing MDT has been discussed primarily focusing on the cell coverage optimization, the discussion of the recent MDT is mainly oriented towards the QoS verification for verifying the quality of services that are provided by UEs. A parameter for the QoS verification is IP throughput for data.

However, the QoS verification scheme which is now in discussion does not provide a clarified definition on the measurement time for measuring the IP throughput. Under the situation where no measurement time is clearly defined, correct measurement is impossible.

Accordingly, a correct temporal definition is needed to estimate packet throughput considering actual data transmission and reception, and a specific scheme for measuring packet throughput taking into consideration a newly defined time of packet measurement is required.

DISCLOSURE

Technical Problem

An object of the present invention is to provide a method and apparatus of measuring a packet throughput in a wireless communication system.

Another object of the present invention is to provide a method and apparatus that transmits a signal including a message for measuring a packet throughput in a wireless communication system.

Further, an object of the present invention is to provide a method and apparatus of determining a start and/or end time for measuring an IP throughput in a wireless communication system.

Still further, an object of the present invention is to provide a method and apparatus of setting a measurement period in a wireless communication system and measuring an IP throughputconsidering the amount of packets received in the set measurement period.

Technical Solution

In an aspect, a method for measuring a throughput in a wireless communication system is provided. The method includes, determining, by a receiver, a start point (T2) at which a data burst begins, determining, by the receiver, an end point (T1) at which the data burst ends, measuring, by the receiver, a throughput of the data burst based on the start point and the end point, wherein the start point is a point in time when a first transmission begins after the receiver estimates that a transmitter's buffer size becomes greater than zero, and wherein the end point (T1) is a point in time when the receiver estimates that the transmitter's buffer size becomes zero.

Wherein the start point (T2) is a point in time when a first transmission begins after the receiver estimates that a transmitter's buffer size becomes greater than zero for a radio bearer of the transmitter, and the end point (T1) is a point in time when the receiver estimates that the transmitter's buffer size becomes zero for a radio bearer of the transmitter.

In another aspect, a wireless device for performing a measurement of a throughput in a wireless communication system is provided. The wireless device includes a radio frequency(RF) unit for receiving a radio signal; and a processor, operatively coupled with the RF unit, configured to determine a start point at which a data burst begins and an end point at which the data burst ends, and measure a throughput of the data burst based on the start point and the end point. Wherein the start point is a point in time when a first transmission begins after the processor estimates that the transmitter's buffer size becomes greater than zero, and the end point is a point in time when the processor estimates that the transmitter's buffer size becomes zero.

Advantageous Effects

A measurement period for measuring a throughput of IP may be apparently determined, and the packet amount may be estimated in the determined measurement period, thus resulting in verification of the IP throughput for data burst being correctly conducted. Accordingly, the base station may efficiently control and manage status link wireless resources of the UE.

Further, in relation to measuring a throughput of data burst(IP packet), each eNB applies the same standard to define the start and end times of data burst, thus ensuring reliability of the value of packet IP throughput as measured by each eNB. By doing so, the present invention may be used for an MDT purpose that enables operators to verify packet throughput, and service quality of the whole system may be enhanced.

DESCRIPTION OF DRAWINGS

FIG. 9 shows a Long BSR MAC Control Element to which the present invention is applied.

MODE FOR INVENTION

Figure 1:
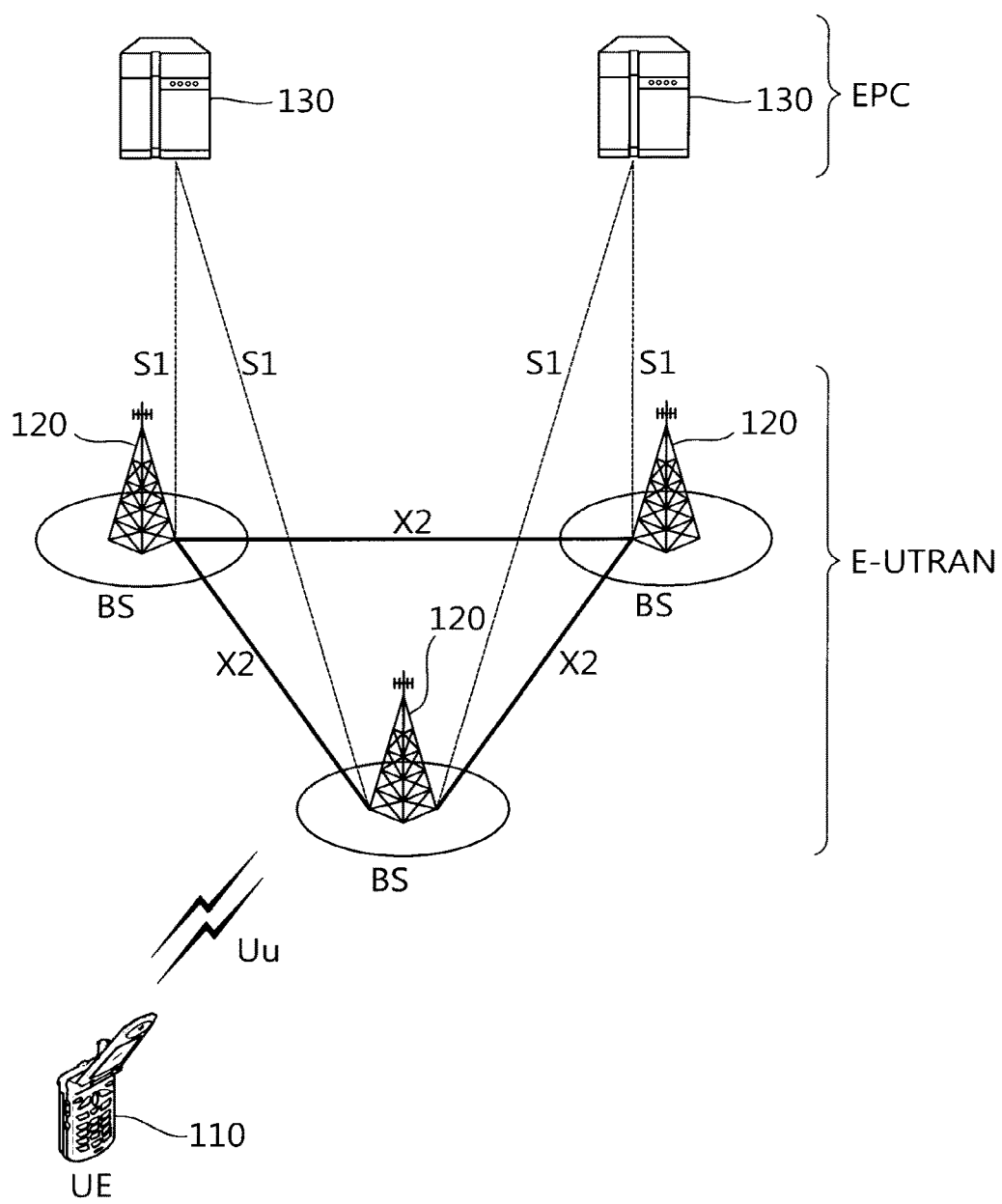
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system. First, the LTE system architecture may generally consist of E-UTRAN (Evolved UMTS Terrestrial Radio Access Network) and EPC (Evolved Packet Core).

The E-UTRAN includes at least one evolved Node-B (eNB) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The eNB 20 is generally a fixed station that communicates with the UE 10 and may be referred to as another terminology, such as a base station (BS), a base transceiver system (BTS), an access point, etc.

The eNBs 20 are interconnected by means of an X2 interface. The eNB s 20 are also connected by means of an S1 interface to an evolved packet core (EPC) 30, more specifically, to a mobility management entity (MME) through S1-MME and to a serving gateway (S-GW) through S1-U. Herein the MME hosts Control-plane functions and the S-GW hosts User-plane functions.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
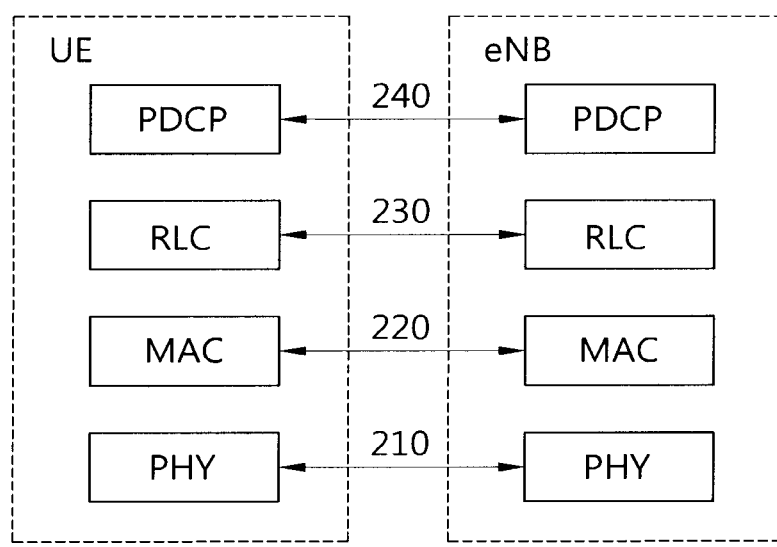
FIG. 2 is a block diagram illustrating a radio protocol architecture for a user plane to which the present invention is applied.
Figure 3:
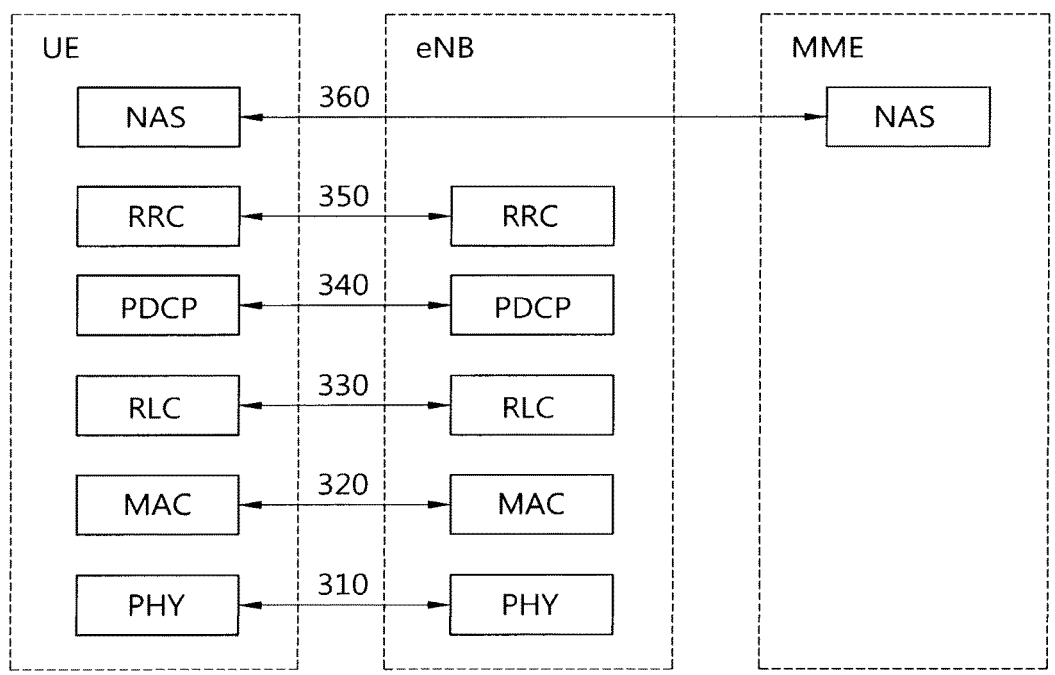
FIG. 3 is a block diagram illustrating a radio protocol architecture for a control plane to which the present invention is applied.

FIG. 2 is a diagram showing a radio protocol architecture for a user plane. FIG. 3 is a diagram showing a radio protocol architecture for a control plane. The user plane is a protocol stack for user data transmission. The control plane is a protocol stack for control signal transmission.

Referring to FIGS. 2 and 3, a PHY layer (210, 310) provides an upper layer with an information transfer service through a physical channel. The PHY layer is connected to a medium access control (MAC) layer (220, 320) which is an upper layer of the PHY layer through a transport channel. Data is transferred between the MAC layer and the PHY layer through the transport channel. The transport channel is classified according to how and with what characteristics data is transferred through a radio interface.

Between different PHY layers, i.e., a PHY layer of a transmitter and a PHY layer of a receiver, data is transferred through the physical channel. The physical channel may be modulated using an orthogonal frequency division multiplexing (OFDM) scheme, and may utilize time and frequency as a radio resource.

Functions of the MAC layer include mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer (230, 330) through the logical channel.

Functions of the RLC layer include RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer (240, 340) in the user plane include user data delivery, header compression, and ciphering. Functions of a PDCP layer in the control plane include control-plane data delivery and ciphering/integrity protection.

A radio resource control (RRC) layer (350) is defined only in the control plane. The RRC layer serves to control the logical channel, the transport channel, and the physical channel in association with configuration, reconfiguration and release of radio bearers (RBs). An RB is a logical path provided by the first layer (i.e., the PHY layer) and the second layer (i.e., the MAC layer, the RLC layer, and the PDCP layer) for data delivery between the UE and the network.

The setup of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state (also may be referred to as an RRC connected mode), and otherwise the UE is in an RRC idle state (also may be referred to as an RRC idle mode).

NAS control protocol (360) performs EPS bearer management, Authentication or Security control at terminated in MME on the network side.

Data is transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several subcarriers in a frequency domain. One subframe includes a plurality of OFDM symbols in the time domain. A resource block is a resource allocation unit, and includes a plurality of OFDM symbols and a plurality of subcarriers. Further, each subframe may use particular subcarriers of particular OFDM symbols (e.g., a first OFDM symbol) of a corresponding subframe for a physical downlink control channel (PDCCH), i.e., an L1/L2 control channel. A transmission time interval (TTI) is a unit time of subframe transmission.

For efficiently using uplink wireless resources, an eNB should recognize what type of data and how much data is transmitted per user. Since, in the case of downlink wireless resources, downlink data is transferred from an access gateway to the eNB, the eNB may grasp how much downlink data is transmitted to each user. However, in the case of uplink, data is generated from a UE (User Equipment), and accordingly, there is no other way but to identify and grasp data reported from each UE.

Further, the eNB is supposed to efficiently use the wireless resources by verifying packet throughputs of UEs that are serviced by an operator, i.e., by determining which UE has a high throughput and which UE has a low throughput. That is, the eNB tries to maximally guarantee per-UE service quality of the operator. For such purpose, the eNB needs to clearly perform data measurement for ensuring service quality for each UE. At this time, in case burst data which abruptly occurs is not correctly measured, that is when measurement is not exactly done for data burst, for example, when the start and end of data burst each are determined by each eNB, reliability may be difficult to secure on values measured by eNBs different from each other.

Accordingly, to verify packet throughput of a UE, a scheme of correctly measuring packet throughput in consideration of per-packet E-RAB or QCI serviced to the UE is suggested in which times that the packet starts and ends being generated are defined and packet measurement is conducted considering the defined times.

More specifically, the eNB estimates packet throughput by receiving data burst that is packets transmitted from a UE during multiple TTIs. At this time, a measurement period for estimating the packet throughput is set using the time that the transmission of the data burst starts and the time that the transmission of the data burst ends, and packet throughput is estimated using the set measurement period and the received data burst.

Figure 4:
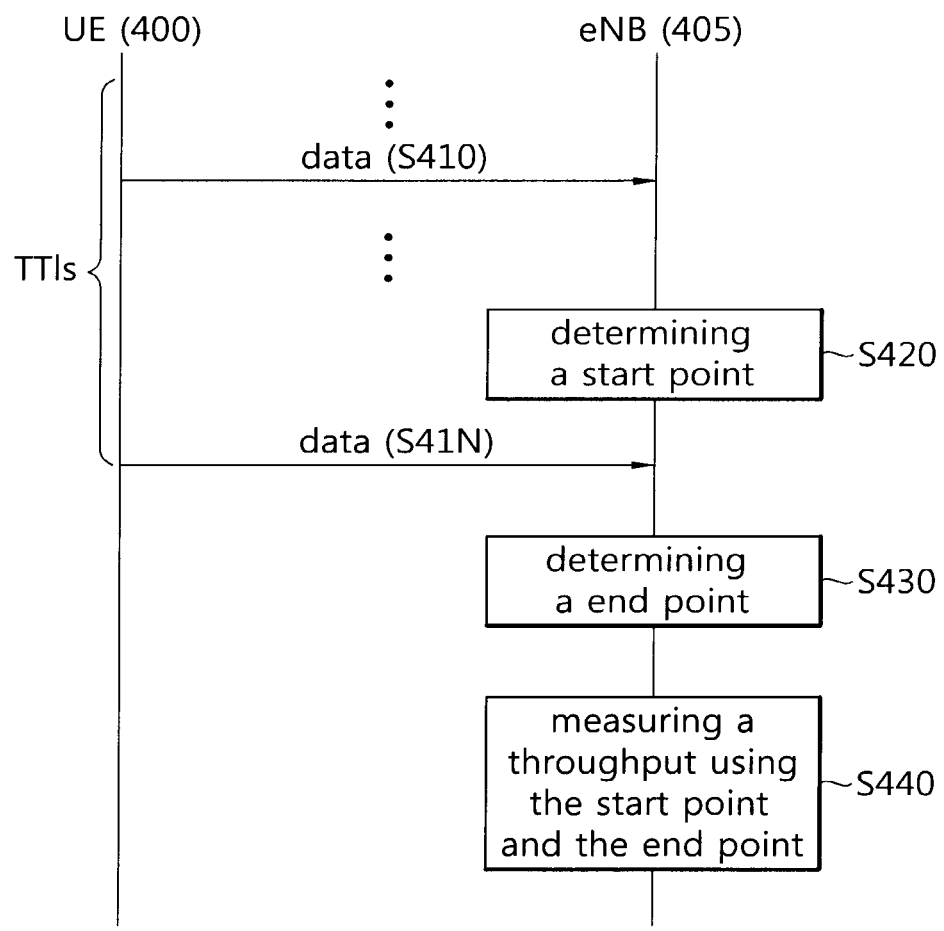
FIG. 4 shows a scheme of measuring a throughput of a data burst according to an embodiment of the present invention.

Here, the data burst includes data transmitted through at least one or more E-RABs for the UE. The E-RAB identifies the concatenation of an Si Bearer and the corresponding Data Radio Bearer(or the corresponding radio bearer). When an E-RAB exists, there is a one-to-one mapping between this E-RAB and an EPS bearer of the Non Access Stratum. FIG. 4 shows a scheme of measuring a IP throughput according to an embodiment of the present invention.

Referring to FIG. 4, the UE 400 transmits packet buffer (or buffer sizes) generated from a UE buffer through multiple TTIs (S410 to 41N). At this time, the several of the packet data generated from the UE are split through the TTIs and are transmitted to the eNB 405. Herein, the packet data of IP packet may also be referred to as data burst, and the data burst is transmitted in a data block having a size determined by each TTI.

The eNB 405 receives packet data across the several of TTIs. The cNB 405 sets a time that the eNB 405 first receives data from the UE while verifying that no data is previously transmitted from the UE 400 as the start time of the data burst. That is, the eNB estimate of the UE buffer size becomes greater than zero for at least one E-RAB of the UE, where previously the estimate was zero for all E-RABs of the UE. The start TTI when the size of UE buffer happens to larger than 0 is set as the start time T2 (S420).

On the contrary, when it comes to the end TTI when transmission of the data burst is ended, when the eNB 405 identifies that no more data is transmitted from the UE 400 while continuing to normally receive data from the UE 400, a time that receipt of the data burst is complete before the time that the data stops being generated is set as the end time of the data burst That is, the eNB estimate of the UE buffer size becomes zero for all E-RABs of the UE, where previously the estimate was greater than zero for at least one E-RAB of the UE (430).

The time when transmission of the previous packet is complete while the UE buffer site is changed back to 0 is set as the end TTI, T1 (S430).

The eNB 405 estimates the total amount of data received during a measurement period defined by the start TTI and the end TTI (i.e., the set T1 and T2) and measures a throughput for the data burst (S440).

Figure 5:
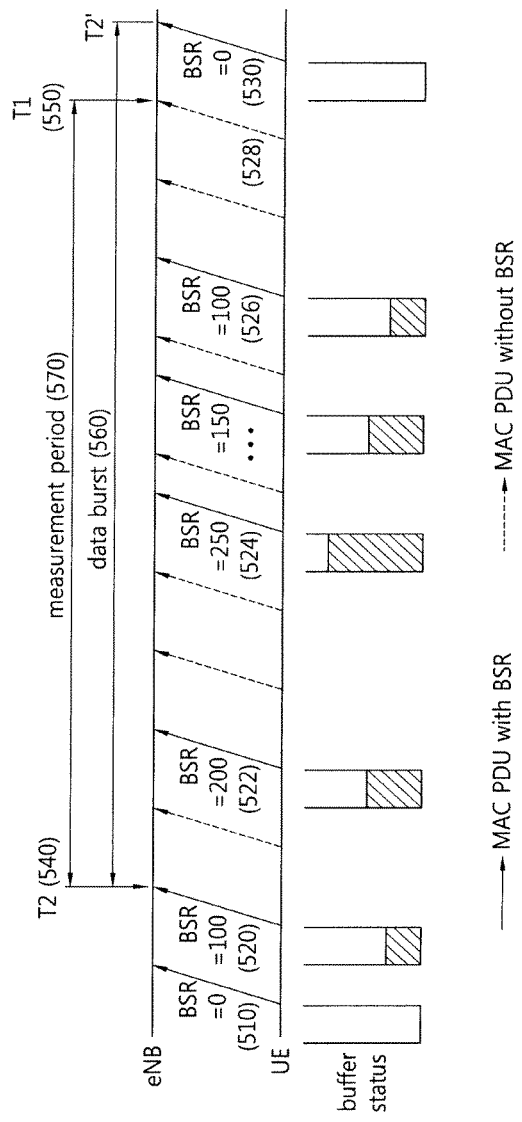
FIG. 5 shows a scheme of determining the start/end time of a data burst according to an embodiment of the present invention.

In this connection, FIG. 5 illustrates a scheme of determining a measurement period for measuring a data burst (IP) throughput according to an embodiment of the present invention. The SSR is described as an example to concretely specify that data is generated.

The Buffer Status reporting procedure is used to provide the eNB(serving) with information about the amount of data available for transmission in the UL buffers of the UE.

Referring to FIG. 5, the UE transmits 'BSR=0' to the base station in step 510 to indicate that the buffer is empty, i.e., that the buffer size of the UE is 0. Thereafter, if data to be transmitted to the UE buffer is generated, the UE, in step 520, transmits 'BSR=100' to indicate that the status of the UE buffer has been increased by more than 0, for example, that the UE buffer size is 100.

By doing so, the base station receives BSR=100 to identify that the UE buffer size for data transmission has been increased from 0 to 100 and determines the time 520 that BSR=100 has been received as the start time of data burst, T2 (540), when data transmission has been started.

Thereafter, the base station receives BSR=200(522), BSR=250(524), . . . , BSR=150(526) from the UE in association with busty data. While continuing to receive busty data that has been generated from the UE, the base station is notified BSR=0, i.e., of the UE buffer size being changed to 0, in step 530. The base station determines, as the end time for the data burst, T1 (550), a completion time 528 that busty data has been successfully received before BSR=0 (560) is received.

In other words, the base station determines the time 540 that BSR=100 has been received while there is no data transmission (BSR=0, 510) as the start time T2 for the data burst. When receiving BSR=0 that is newly transmitted while continuing to receive the data burst, the base station determines the time 550 that data has been successfully transmitted before the time 560 that BSR=0 is received as the end time T1 of the corresponding relevant packet data. The base station determines a difference between the determined start time T2 and end time T1 (i.e., T1-T2, ms) as a measurement period for the data burst (570). The measurement period is defined as a time for measuring data burst throughput. Here, a method of measuring data burst using BSR according to an embodiment of the present invention may apply per logical channel group (LCG). This is why the buffer size of BSR is calculated per LCG.

Accordingly, when it is reported by the UE that buffer size>0 for the LCG from which buffer size=0 has been previously reported, the base station may determine that data burst for a specific LCG of the UE has started (T2). Further, if buffer size=0 has been reported to the base station from the UE with respect to the LCG from which buffer size>0 has been reported previously, the base station may judge that data burst for a specific LCG of the UE has been ended (T1). Thus, T2 and T1 for the LCG may be identified to obtain the data burst 560 for a specific LCG, i.e., IP throughout through the measurement period 570 for data burst.

Figure 6:
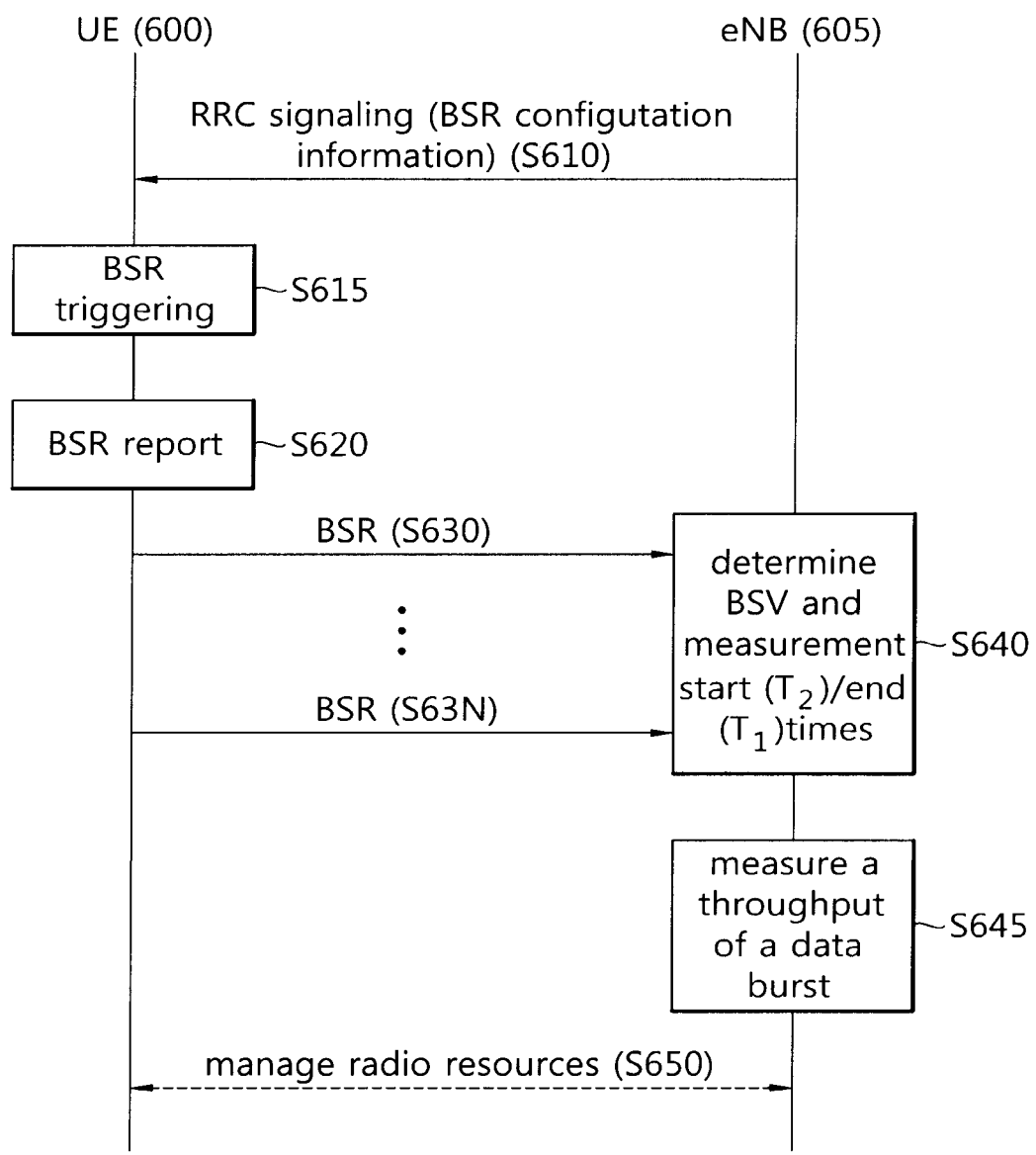
FIG. 6 shows a scheme of measuring a throughput of a data burst using a Buffer Status Report (BSR) according to an embodiment of the present invention.

FIG. 6 is a view illustrating a signaling scheme for measuring IP throughput using a BSR according to an embodiment of the present invention.

Referring to FIG. 6, a UE 600 and a base station 605 controls a BSR procedure associated with the logical channel in each UE through MAC-MainConfig signaling defined in the RRC layer (S610). The RRC message includes information in a BSR periodic timer (periodicBSR-Timer) and/or a BSR re-transmission timer (retxBSR-Timer). Further, the RRC message includes configuration information associated with the format of BSR and data size.

Here, the BSR procedure proceeds per LCG, and as an example, the UE may receive LCs assigned to each LCG through RRC signaling from different base stations that are connected to the UE. That is, the UE may distinguish a base station targeted for BSR from the others based on the LCG.

By way of example, the BSR for a macro base station may separate LCGs into #0 or #1 and the BSR for a small base station may separate LCGs into #2 or #3.

At any time, the UE triggers a BSR (S615).

A Buffer Status Report (BSR) shall be triggered if any of the following events occur:

UL data, for a logical channel which belongs to a LCG, becomes available for transmission in the RLC entity or in the PDCP entity (the definition of what data shall be considered as available for transmission is specified in [3] and [4] respectively) and either the data belongs to a logical channel with higher priority than the priorities of the logical channels which belong to any LCG and for which data is already available for transmission, or there is no data available for transmission for any of the logical channels which belong to a LCG, in which case the BSR is referred below to as "Regular BSR";

UL resources are allocated and number of padding bits is equal to or larger than the size of the Buffer Status Report MAC control element plus its subheader, in which case the BSR is referred below to as "Padding BSR";

retxBSR-Timer expires and the UE has data available for transmission for any of the logical channels which belong to a LCG, in which case the BSR is referred below to as "Regular BSR";

periodicBSR-Timer expires, in which case the BSR is referred below to as "Periodic BSR".

Based on the BSR triggering, the UE may configure a BSR (S620). The BSR is configured in consideration of the configuration information established by RRC signaling, and is now described with reference to FIGS. 7, 8, and 9.

Figure 7:
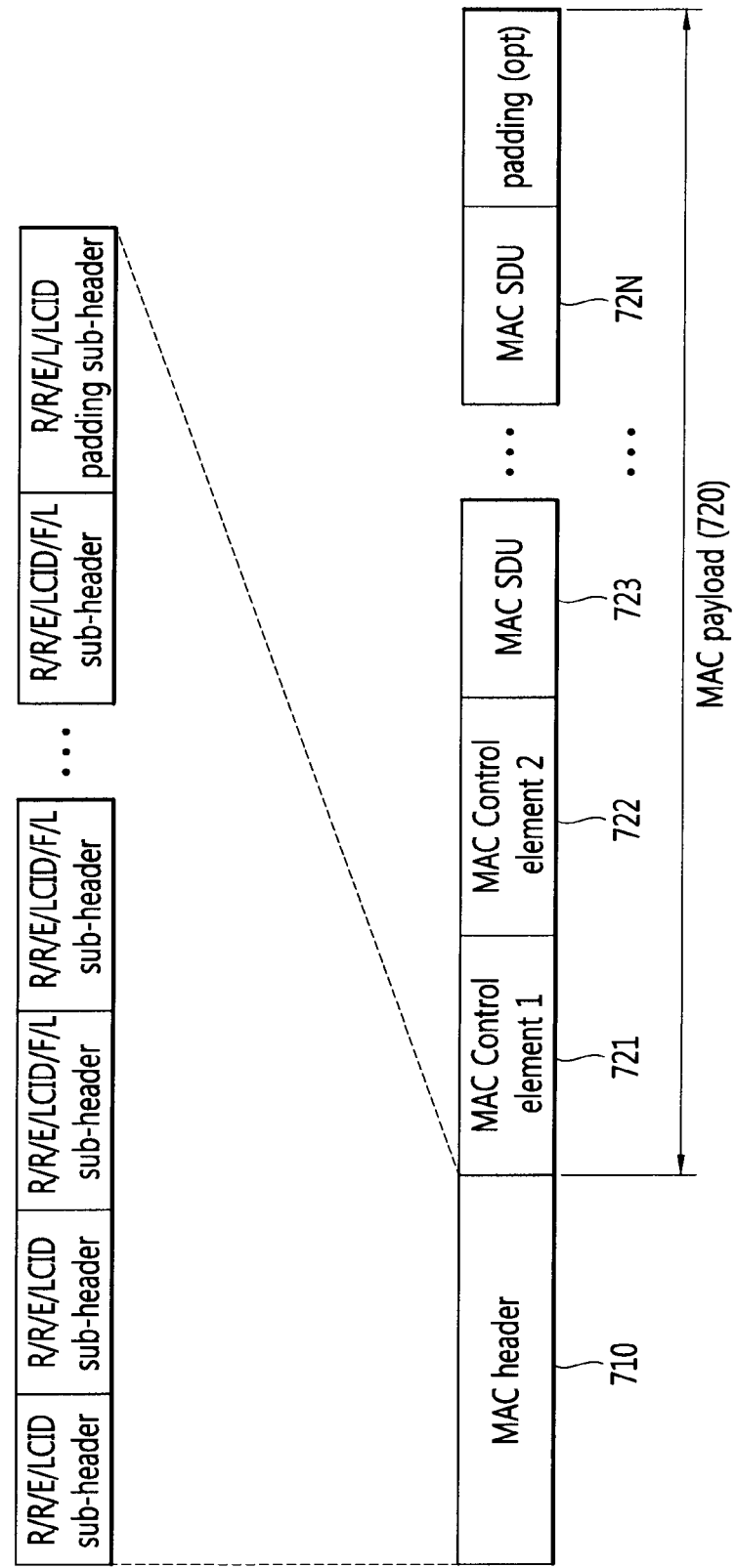
FIG. 7 shows the architecture of a medium access control (MAC) message for a BSR to which the present invention is applied.

FIG. 7 is a view illustrating the architecture of amedium access control (MAC) message for BSR to which the present invention applies. As shown in FIG. 7, the BSR is transmitted in a form of MAC signaling, and the BSR configured by the UE is identified by a setting value of the LCID (Logical Channel ID) of the MAC header 710. By way of example, in case the LCID value is set as 11101, this denotes that aBSR MAC CE 720 having a short BSR format is transmitted (refer to FIG. 8), and in case the LCID value is set as 11110, this denotes that a BSR MAC CE 720 having a long BSR format is transmitted (refer to FIG. 9). Accordingly, the base station may recognize the BSR format of the MAC CE through the LCID value of the MAC header.

Figure 8:
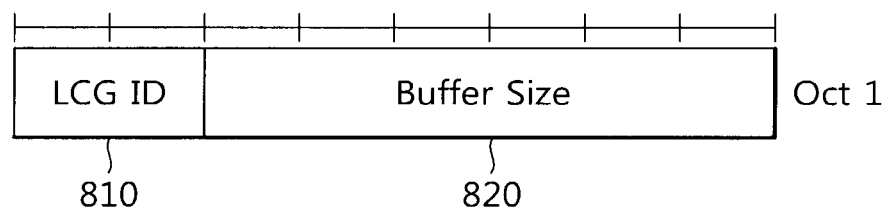
FIG. 8 shows a Short BSR MAC Control Element to which the present invention is applied.

FIG. 8 is a view illustrating a Short BSR MAC Control Element to which the present invention applies.

Referring to FIG. 8, the Short BSR and Truncated BSR forma has one LCG ID field and one corresponding Buffer Size field. Herein LCG ID(The Logical Channel Group ID, 810) field identifies the group of logical channel(s) which UE buffer status is being reported. The length of the field is 2 bits. The Buffer Size(820) identifies the total amount of data available across all logical channels of the LCG, and the length of this field is 6 bits.

FIG. 9 is a view illustrating a Long BSR MAC Control Element to which the present invention applies.

The long BSR includes the buffer amount (size) in the order from the logical channel group with LCG ID 0 (910) to the logical channel group with LCG ID 3 (940) without any logical channel group identifier. Here, one LCG includes one or more RBs, and the buffer size field value for the LCG is the total sum of data available for transmission in the RLC layer and the PDCP of all the RBs included in the LCG.

At this time, the data available for transmission in the PDCP and RLC layer may be defined as follows.

Data available for transmission in RLC

For the purpose of MAC buffer status reporting, the UE shall consider the following as data available for transmission in the RLC layer:

RLC SDUs, or segments thereof, that have not yet been included in an RLC data PDU;

RLC data PDUs, or portions thereof, that are pending for retransmission (RLC AM).

In addition, if a STATUS PDU has been triggered and the status prohibit timer is not running or has expired, the UE shall estimate the size of the STATUS PDU that will be transmitted in the next transmission opportunity, and consider this as data available for transmission in the RLC layer.

Data available for transmission in PDCP

For the purpose of MAC buffer status reporting, the UE shall consider PDCP Control PDUs, as well as the following as data available for transmission in the PDCP layer:

For SDUs for which no PDU has been submitted to lower layers:

the SDU itself, if the SDU has not yet been processed by PDCP, or the PDU if the SDU has been processed by PDCP.

In addition, for radio bearers that are mapped on RLC AM, if the PDCP entity has previously performed the re-establishment procedure, the UE shall also consider the following as data available for transmission in the PDCP layer:

For SDUs for which a corresponding PDU has only been submitted to lower layers prior to the PDCP re-establishment, starting from the first SDU for which the delivery of the corresponding PDUs has not been confirmed by the lower layer, except the SDUs which are indicated as successfully delivered by the PDCP status report, if received:

the SDU, if it has not yet been processed by PDCP, or the PDU once it has been processed by PDCP.

Here, the UE determines an index that is a value to be inserted into the buffer size field (6 bits) in consideration of 'extendedBSR-Sizes is configured/or not configured' with respect to the amount of data to be transmitted.

By way of example, <Table 1> illustrates Buffer size levels for BSR, and <Table 2> illustrates Extended Buffer size levels for BSR. Referring to <Table 1> and <Table 2>, it can be seen that different buffer size values are provided for the same index extendedBSR-Sizes may be configured by RRC signaling of the base station. The <Table 1> and <Table 2> illustrate only part of the corresponding tables for ease of description.

TABLE 1

| Index | Buffer Size (BS) value [bytes] | Index | Buffer Size (BS) value [bytes] |
|---|---|---|---|
| 0 | BS = 0 | 32 | 1132 < BS <= 1326 |
| 1 | 0 < BS <= 10 | 33 | 1326 < BS <= 1552 |
| 2 | 10 < BS <= 12 | 34 | 1552 < BS <= 1817 |
| 3 | 12 < BS <= 14 | 35 | 1817 < BS <= 2127 |
| 4 | 14 < BS <= 17 | 36 | 2127 < BS <= 2490 |
| 5 | 17 < BS <= 19 | 37 | 2490 < BS <= 2915 |
| 6 | 19 < BS <= 22 | 38 | 2915 < BS <= 3413 |
| 7 | 22 < BS <= 26 | 39 | 3413 < BS <= 3995 |

TABLE 2

| Index | Buffer Size (BS) value [bytes] | Index | Buffer Size (BS) value [bytes] |
|---|---|---|---|
| 0 | BS = 0 | 32 | 4940 < BS <= 6074 |
| 1 | 0 < BS <= 10 | 33 | 6074 < BS <= 7469 |
| 2 | 10 < BS <= 13 | 34 | 7469 < BS <= 9185 |
| 3 | 13 < BS <= 16 | 35 | 9185 < BS <= 11294 |
| 4 | 16 < BS <= 19 | 36 | 11294 < BS <= 13888 |
| 5 | 19 < BS <= 23 | 37 | 13888 < BS <= 17077 |
| 6 | 23 < BS <= 29 | 38 | 17077 < BS <= 20999 |
| 7 | 29 < BS <= 35 | 39 | 20999 < BS <= 25822 |

The UE transmits the configured BSR (S630, ..., S63N). According to the present invention, the UE, in case the buffer size changes from 0 to a value larger than 0, may trigger and transmit the BSR, and in case the buffer size changes from the 0 more to a value of 0, may trigger and transmit the BSR in order to inform the end of the data burst.

Accordingly, the base station determines the start and end of the data burst through the received BSR. The base station determines that the data burst has started in case buffer size>0 is reported from the UE from which buffer size=0 has been previously reported, and the base station determines, in the following case, that the data burst in the UE has been ended when buffer size=0 is reported from the UE from which buffer size>0 has been previously reported. Here, the BSR is transmitted as long BSR (refer to FIG. 9) or short BSR (refer to FIG. 8) with respect to the number of LCGs configured in the UE, and the base station determines that the UE's buffer size=0 if buffer size=0 for all the LCGs irrespective of the number of LCGs configured in the UE, and determines that the UE's buffer size>0 once buffer size>0 with respect to at least one LCG.

The base station, when determining based on the above standard that the data burst occurs in the UE, may define the start time (T2) and end time (T1), which are reference times for calculating scheduled IP throughput for the data burst as follows:

start time T2 of calculation of scheduled IP throughput

The time of receipt of BSR with buffer size>0 from the UE that has had reported buffer size=0 before Or, the time that UL grant through which BSR with buffer size>0 is assigned to the UE Or, the time that a data block is first received from the UE after the UE's buffer size changes from 0 to a value larger than 0 end time T1 of calculation of scheduled IP throughput

The time of receipt of BSR with buffer size=0 from the UE that has reported buffer size>0 before Or, the time that a data block is received last from the UE before the UE's buffer size changes from a value larger than 0 to 0.

Accordingly, the base station, after obtaining the calculation reference times T2 and T1 for a specific data burst, determines measurement period for the data burst, ThpTimeUL=T1-T2 and identifies the total amount, ThpVolUl=PDCP SDU, of data received during the measurement period, i.e., between T2 and T1.

Accordingly, Scheduled IP throughput may be defined as in <Equation1> for all the data bursts that are generated during one measurement time period:

$$\text{If } \sum ThpTimeUl > 0, \quad \frac{\sum ThpVolUl}{\sum ThpTimeUl} \times 1000 [\text{kbits/s}] \quad \langle \text{Equation 1} \rangle$$

$$\text{If } \sum ThpTimeUl = 0, \quad 0 \ [\text{kbits/s}]$$

The base station may correctly determine the Scheduled IP throughput through <Equation 1> (S645). Further, the base station efficiently manages wireless resources for each UE through the measured the Scheduled IP throughput (S650).

Accordingly, in the present invention, without addition of separate signaling and through the existing BSR procedure, the UE may provide the base station with information necessary for scheduling uplink wireless resources, and the base station may determine a measurement period for estimating throughput of an uplink packet through the existing BSR procedure, may estimate uplink packet throughput through the amount of uplink packets during the determined measurement period, and may provide for efficient control of uplink wireless resources.

Further, upon measuring the uplink packet, different base stations may calculate the scheduled IP throughput of each UE based on a consistent standard with respect to the bursty traffic of each UE, thus allowing the present invention to fit for the MDT purpose of the operator verifying the throughput of the UEs which are serviced by the operator.

Figure 10:
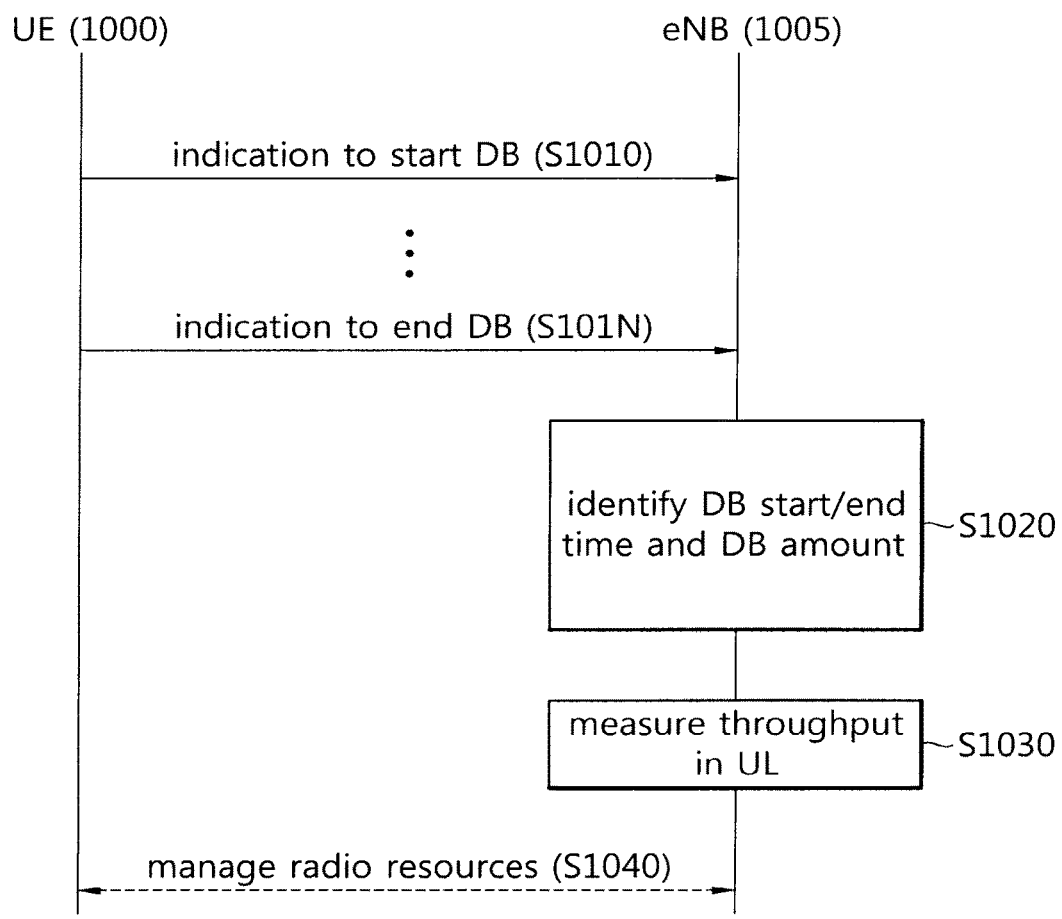
FIG. 10 shows a scheme of measuring a throughput of a data burst using a data burst indication message according to an embodiment of the present invention.

FIG. 10 is a view illustrating a scheme of measuring packet throughput using a data burst indication message according to another embodiment of the present invention.

Referring to FIG. 10, the UE may indicate the start and end of a data burst using an indication message S1010, 101N. According to the present invention, the UE, if data is generated that is to be transmitted to the empty buffer of the UE, transmits a data burst start indication to the base station, and if all data in the buffer of the UE is transmitted and the buffer is empty, transmits a data burst end indication to the base station. At this time, the indications may be transmitted in the form of an MAC message. The amount of data that is generated in the UE buffer associated with the data burst may be reported separately from the indication message or as a single integrated message.

Accordingly, the base station determines the time of reception of the data burst start indication as an IP throughput calculation start time T2 and determines the time of reception of the data burst end indication as an IP throughput calculation end time T1. The base station then identifies a total amount of data burst that is received during a measurement period that is defined through the times (S1020). The base station may obtain the scheduled IP throughput by identifying the amount of data received during the throughput measurement period that is calculated based on T2 and T1 using Equation 1 above (S1030).

Further, in case the measured scheduled IP throughput shows that the throughput of some UE is good (high), a wireless resource assigned to maintain the throughput may be sustained, or in case the measured Scheduled IP throughput shows that the throughput of some UE is bad (low), a wireless resource may be additionally allocated or re-allocated to maintain the service quality of the UE (S1040).

Figure 11:
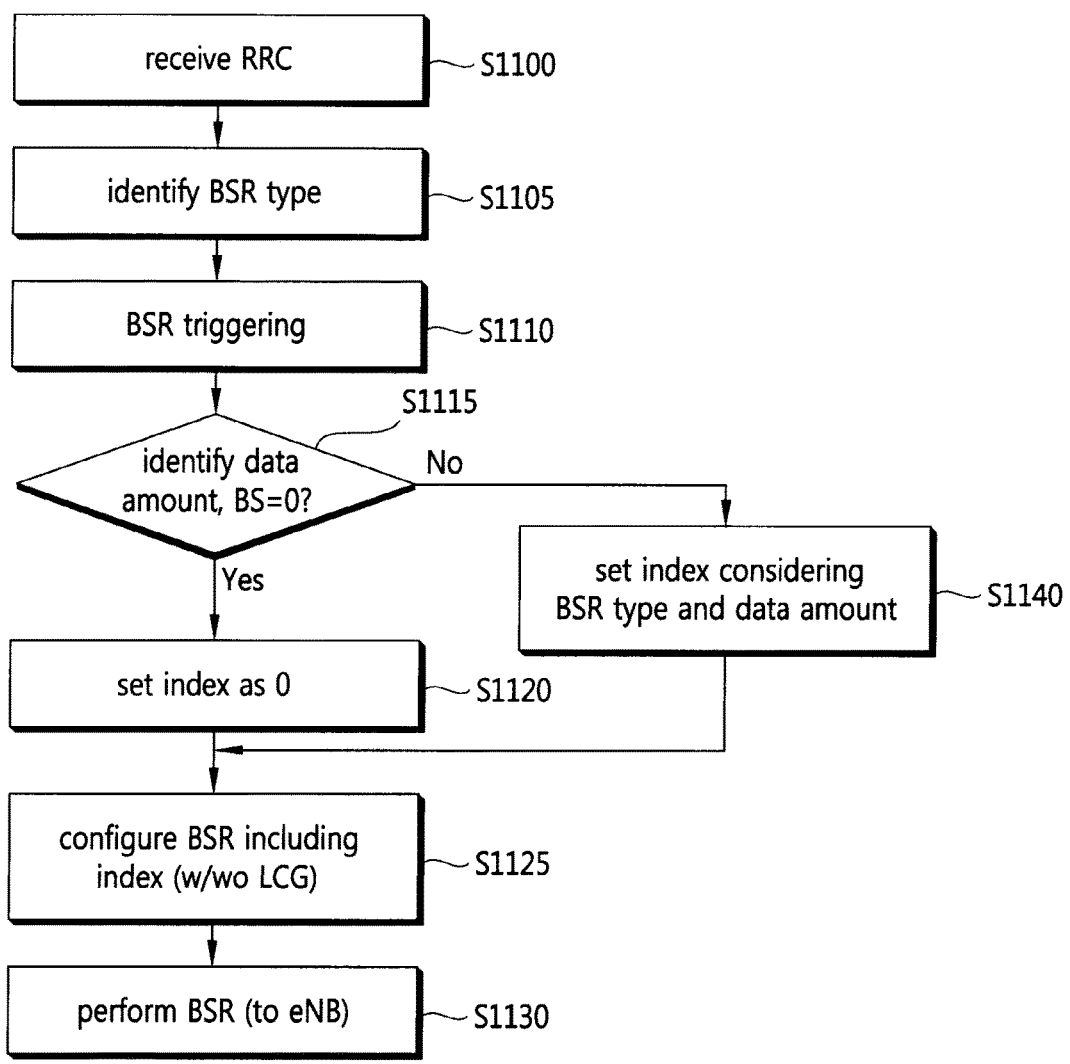
FIG. 11 is a flowchart illustrating an operation of a UE notifying a data burst using a BSR according to an embodiment of the present invention.

FIG. 11 is a flowchart illustrating an operation of a UE notifying a data burst using a BSR according to an embodiment of the present invention.

Referring to FIG. 11, the UE receives RRC signaling from the base station (S1100). At this time, the base station is a serving base station that remains wirelessly connected with the UE. The UE identifies the BSR type for each LCG through the received RRC signaling (S1105). By way of example, this invention includes the BSR for #0 constitutes a short BSR, and the BSR for #3 may constitute a long BSR.

The UE identifies whether to satisfy BSR triggering (S1110). According to the present invention, the UE performs BSR triggering by identifying the amount of data that corresponds to the UE buffer size. As an example, The UE can trigger a BSR when a BSR value of a LCG is changed from 0 to a certain value. This is triggering for indicating the start of a data burst. On the other hand, The UE can also trigger a BSR when a BSR value of a LCG is changed from a certain value to 0. This is triggering for indicating the end of a data burst (S1115).

In case the UE buffer size is changed to 0, in other words, when the UE identifies that no data to be transmitted is in the UE buffer, the UE sets the index of the BSR buffer size to 0 (S1120) and constitutes a BSR in the form of including an LCG ID considering the BSR type defined per LCG in the set buffer size or constitutes a BSR in the form of sequentially inserting LCG ID 0 to LCG ID 3 without an LCG ID. Further, the UE inserts an LCID corresponding to the constituted BSR type, thereby completing a BSR MAC message (S1125). The UE transmits the configured BSR to the base station (S1130). Accordingly, the UE may indicate that data is terminated corresponding to each LCG.

In contrast, in case the UE buffer size is changed from 0 to a certain value in step 1115, in other words, when the UE identifies that data to be transmitted is present in the UE buffer, the UE sets an index to be inserted into the buffer size field considering the BSR type and the identified data amount (S1140). The UE inserts an LCID corresponding to the BSR type into the configured index and then transmits the configured BSR to the base station (S1130). Accordingly, the UE may indicate that data is generated (happened)/ended (or completed to transmit successfully) corresponding to each LCG.

Figure 12:
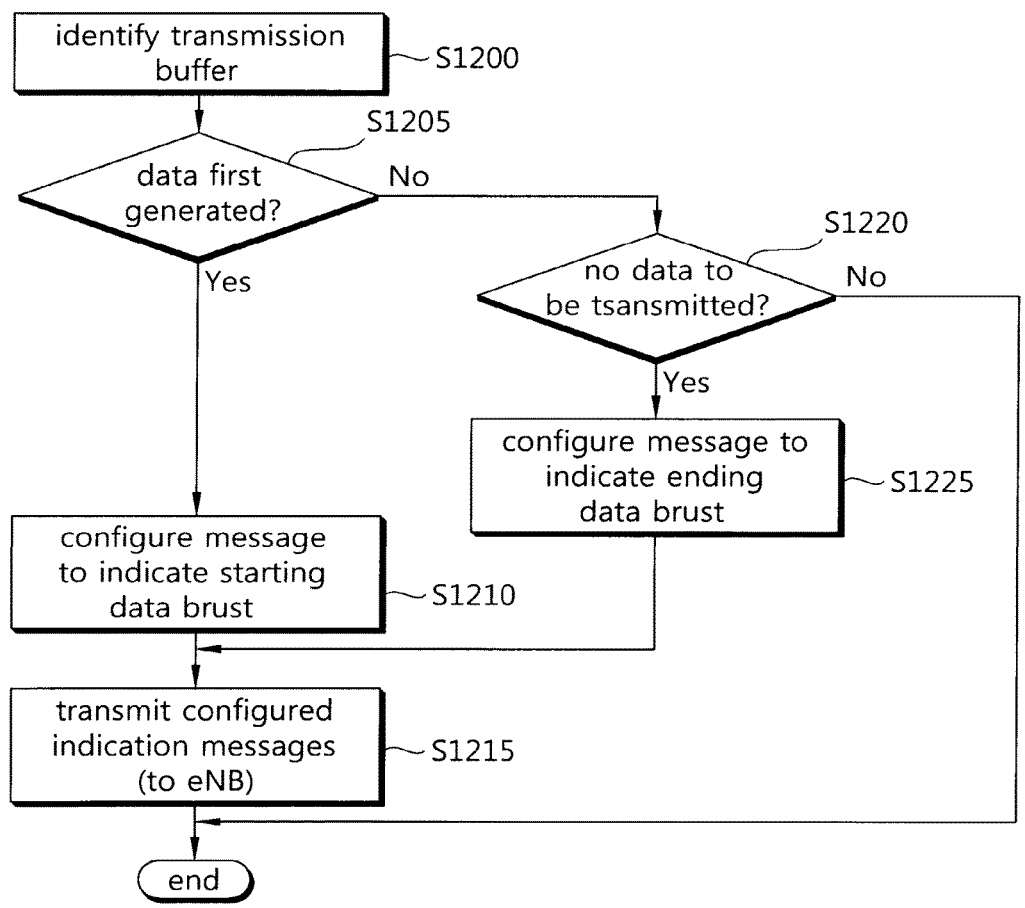
FIG. 12 is a flowchart illustrating an operation of a UE notifying a data burst using an indication message according to an embodiment of the present invention.

FIG. 12 is a flowchart illustrating an operation of a UE notifying a data burst using an indication message according to an embodiment of the present invention.

Referring to FIG. 12, the UE identifies the UE transmission buffer (S1200). The UE verifies whether the UE buffer used to be empty and for transmission of bursty data transmission of data is first conducted in the UE buffer (S1205). The UE can determine that a BSR value of a LCG is changed from 0 to a certain value by checking the UE buffer and set an indication to notify occurrence of data burst to '1' (data burst start indication)(S1210).

On the contrary, if the UE identifies that the UE buffer used to be filled and as the data transmission is complete, the UE buffer happens to get emptied (S1120), that is, the UE can determine that a BSR value of a LCG is changed from a certain value to 0 and set an indication to notify completion of transmission for the data burst to '0' (data burst end indication)(S1125). the indication associated with the data burst may be set to have an opposite value of the value suggested in the above example.

A start indication message S1210 for indicating the start of a data burst for any LCG constituted by the UE or an end indication message S1225 for indicating the end of data burst may be transmitted in the form of an MAC message. For example, the data burst indication may be made using a reserved bit of the MAC header.

The UE transmits the configured data burst indication message to the base station (S1215).

Figure 13:
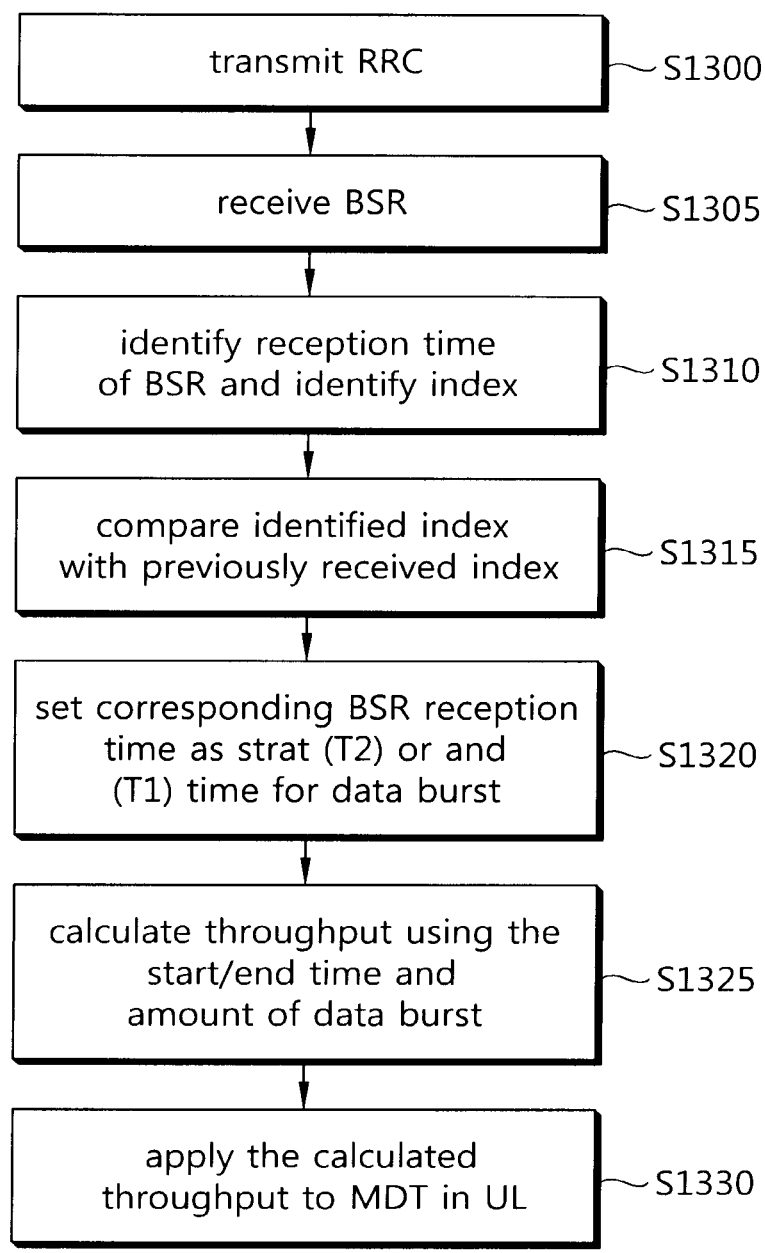
FIG. 13 is a flowchart illustrating an operation of a base station determining a data burst using a BSR according to an embodiment of the present invention.

FIG. 13 is a flowchart illustrating an operation of a base station determining a data burst using a BSR according to an embodiment of the present invention.

Referring to FIG. 13, the base station transmits information for a BSR configuration to the UE through MAC-MainConfig (S1300). The base station receives a BSR reported from the UE according to the BSR configuration information (S1305). The base station identifies the time that the BSR is received and identifies the index set in the buffer size field of the BSR (S1310).

The base station identifies the UE buffer size, i.e., the amount of data transmitted, using the identified buffer size field. At this time, the base station identifies the start or end of an uplink data burst by checking an index change of the buffer size field, i.e., by comparing the received index with a previously received index (S1315). Further, the base station determines the time of start or end as described below by comparing the indexes (S1320).

When the eNB receives a BSR with value larger than 0 from the UE whose BSR was previously 0, eNB determines that a data burst starts, and sets T2 to the time;
   when the BSR (with value larger than 0) is received, or
   when the UL grant is allocated to the UE, or
   when a data block is received from the UE for the first time after the BSR is changed from 0 to certain value.
whreras, When the eNB receives a BSR with value equal to 0 from the UE whose BSR was previously larger than 0, eNB determines that a data burst ends, and sets T1 to the time;
   when the BSR (with value equal to 0) is received, or
   when the last data block is received before the reception of the BSR with 0.

The BSR value can be evaluated per LCG (Logical Channel Group). It means that the above operation can be applied to a LCG not to a UE.

When the eNB receives a BSR of a LCG with value larger than 0 from the UE whose BSR of the LCG was previously 0, it considers that a data burst starts, and sets T2 to the time;
   when the BSR of the LCG (with value larger than 0) is received, or
   when the UL grant is allocated to the UE, or
   when a data block is received from the UE for the first time after the BSR of the LCG is changed from 0 to certain value.
When the eNB receives a BSR of a LCG with value equal to 0 from the UE whose BSR of the LCG was previously larger than 0, it considers that a data burst ends, and sets T1 to the time;
   when the BSR of the LCG (with value equal to 0) is received, or
   when the last data block is received before the reception of the BSR of the LCG with 0.

The base station defines a measurement period (ThpTimeUL) for measuring a data burst using T1 and T2 as set above, and calculates the throughput using the total amount of the data burst received during the measurement period (S1325). The base station provides the calculated scheduled IP throughput to a higher network so that the operator may use it for the purpose of MDT to verify the throughput of UEs which are serviced by the operator (S1330).

Figure 14:
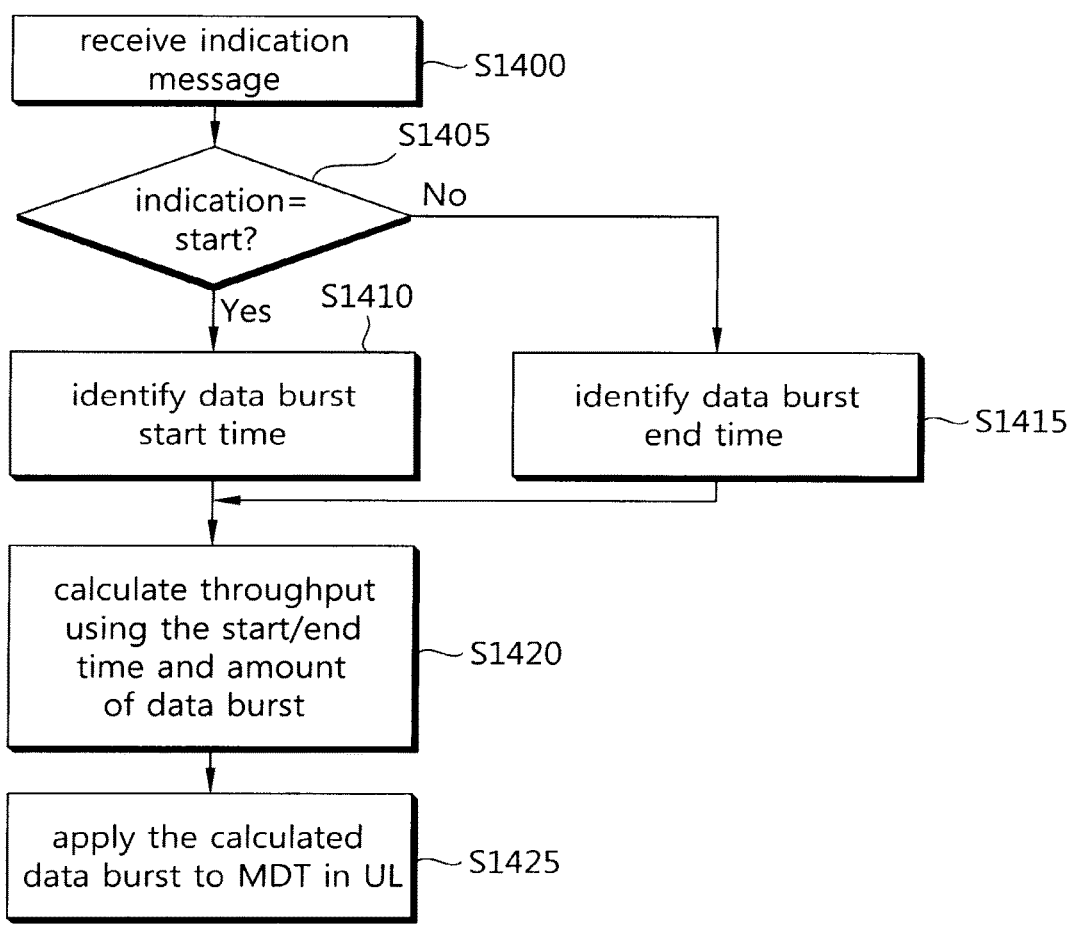
FIG. 14 is a flowchart illustrating an operation of a base station judging a data burst using an indication message according to an embodiment of the present invention.

FIG. 14 is a flowchart illustrating an operation of a base station judging a data burst using an indication message according to an embodiment of the present invention.

Referring to FIG. 14, the base station receives an indication message associated with a data burst (S1400).

The eNB can determine that a BSR value of a LCG is changed from 0 to a certain value by checking the received indication. If the indication set to '1' (data burst start indication) (S1405, Yes), it is determined that the data burst is occurred in UE buffer and it sets T2 to the time it receives the start indication (S1410).

Whereas, the eNB can determine that a BSR value of a LCG is changed from a certain value to 0 by checking the received indication. If the indication set to '0' (data burst end indication) (S1405, No), it is determined that transmission of the data burst is completed in UE buffer and the UE buffer becomes empty after the transmission of the last data block. It sets T1 to the time it receives the end indication (S1415).

The base station defines a measurement period for measuring the data burst using T1 and T2 as set above, and calculates the throughput as the IP throughput using the total amount of data burst received during the measurement period (S1420). By doing so, multiple UEs including the UE utilize the throughput for the purpose of verification for MDT (S1425).

The technical concept of the present invention is based on provisional documents as described in the below.
<Start of Priority Document>
[Invention 1] Burst_Timer
A timer called Burst_Timer is used by the receiver (eNB for UL, UE for DL) to detect a data burst.
   When the receiver receives a data block while the Burst_Timer is not running, the receiver shall:
     Start the Burst_Timer;
     Set T2 to the time the Burst Timer starts (or the time the receiver receives the data block).
   When the receiver receives a data block while the Burst Timer is running, the receiver shall:
     Restart the Burst_Timer.
   When the Burst_Timer expires, the receiver shall:
     Set T1 to the time the Burst Timer expires.
The receiver can be either an eNB or a UE.
The receiver decides the transmission time of the data burst, i.e. ThpTimeUL, as T1-T2.
The receiver calculates the throughput of the data burst as [(volume of successfully received PDCP SDUs during ThpTimeUL)/ThpTimeUL].

The above operation can be performed in one of Layer 2 radio protocols, i.e. MAC (HARQ), RLC, or PDCP. For MAC, the operation is applied to a UE, and for RLC and PDCP, the operation is applied to each RB.

The data block can be one of MAC PDU, MAC SDU, RLC PDU, RLC SDU, PDCP PDU, or PDCP SDU.

The layer 2 control PDUs (e.g. MAC Control Element, RLC Control PDU, PDCP Control PDU) are not considered as data blocks, so the Burst_Timer operation is not applied to the layer 2 control PDUs.

The value of the Burst_Timer is signalled from eNB to UE by one of RRC message, MAC Control PDU, RLC Control PDU, or PDCP Control PDU.

If the above operation is performed in MAC HARQ, the data block may be limited to a new data block, i.e. only the initial transmission is considered and retransmission is not considered.

If the above operation is performed in AM RLC, the behavior at Burst_Timer expiry is changed as below to cope with possible RLC retransmission.
   When the Burst Timer expires, the receiver shall:
     If an RLC Data PDU remains in the reception buffer (i.e. out-of-sequence RLC Data PDU):
       Restart the Burst Timer;
     Else:
       Set T1 to the time the Burst_Timer expires.

[Invention 2] Explicit indication

The transmitter indicates to the receiver, the start and the end of the data burst.

The transmitter can be either a UE or an eNB, and the receiver can be either an eNB or a UE.

The transmitter triggers to send a start indication when a data block is received from the upper layer to the empty transmission buffer.

The transmitter triggers to send an end indication when the transmission buffer becomes empty (after the transmission of the last data block).

The transmitter sends the start indication just before the first data block of the data burst, and sends the end indication right after the last data block of the data burst.

The data block can be one of MAC PDU, MAC SDU, RLC PDU, RLC SDU, PDCP PDU, or PDCP SDU.

The indication can be sent as one of MAC Control Element, RLC Control PDU, or PDCP Control PDU.

When the receiver receives a start indication, it sets T2 to the time it receives the start indication.

When the receiver receives an end indication, it sets T1 to the time it receives the end indication.

The receiver decides the transmission time of the data burst, i.e. ThpTimeUL, as T1-T2.

The receiver calculates the throughput of the data burst as [(volume of successfully received PDCP SDUs during ThpTimeUL)/ThpTimeUL].

The transmitter can transmit the same indication multiple times to increase the robustness.

When the receiver receives the same indication multiple times, the receiver applies T2 or T1 to the first time the start or end indication is received.

[Invention 3] Indication by BSR (Buffer Status Report)

When the eNB receives a BSR with value larger than 0 from the UE whose BSR was previously 0, it considers that a data burst starts, and sets T2 to the time;
   when the BSR (with value larger than 0) is received, or
   when the UL grant is allocated to the UE, or
   when a data block is received from the UE for the first time after the BSR is changed from 0 to certain value.

When the eNB receives a BSR with value equal to 0 from the UE whose BSR was previously larger than 0, it considers that a data burst ends, and sets T1 to the time;
   when the BSR (with value equal to 0) is received, or
   when the last data block is received before the reception of the BSR with 0.

The UE can trigger a BSR when the BSR value is changed from 0 to a certain value. (indication for burst start)

The UE can trigger a BSR when the BSR value is changed from a certain value to 0. (indication for burst end)

The BSR value can be evaluated per LCG (Logical Channel Group). It means that the above operation can be applied to a LCG not to a UE.

When the eNB receives a BSR of a LCG with value larger than 0 from the UE whose BSR of the LCG was previously 0, it considers that a data burst starts, and sets T2 to the time;
   when the BSR of the LCG (with value larger than 0) is received, or
   when the UL grant is allocated to the UE, or
   when a data block is received from the UE for the first time after the BSR of the LCG is changed from 0 to certain value.

When the eNB receives a BSR of a LCG with value equal to 0 from the UE whose BSR of the LCG was previously larger than 0, it considers that a data burst ends, and sets T1 to the time;
   when the BSR of the LCG (with value equal to 0) is received, or
   when the last data block is received before the reception of the BSR of the LCG with 0.

The UE can trigger a BSR when a BSR value of a LCG is changed from 0 to a certain value. (indication for burst start)

The UE can trigger a BSR when a BSR value of a LCG is changed from a certain value to 0. (indication for burst end)

<End of Priority Document>

Figure 15:
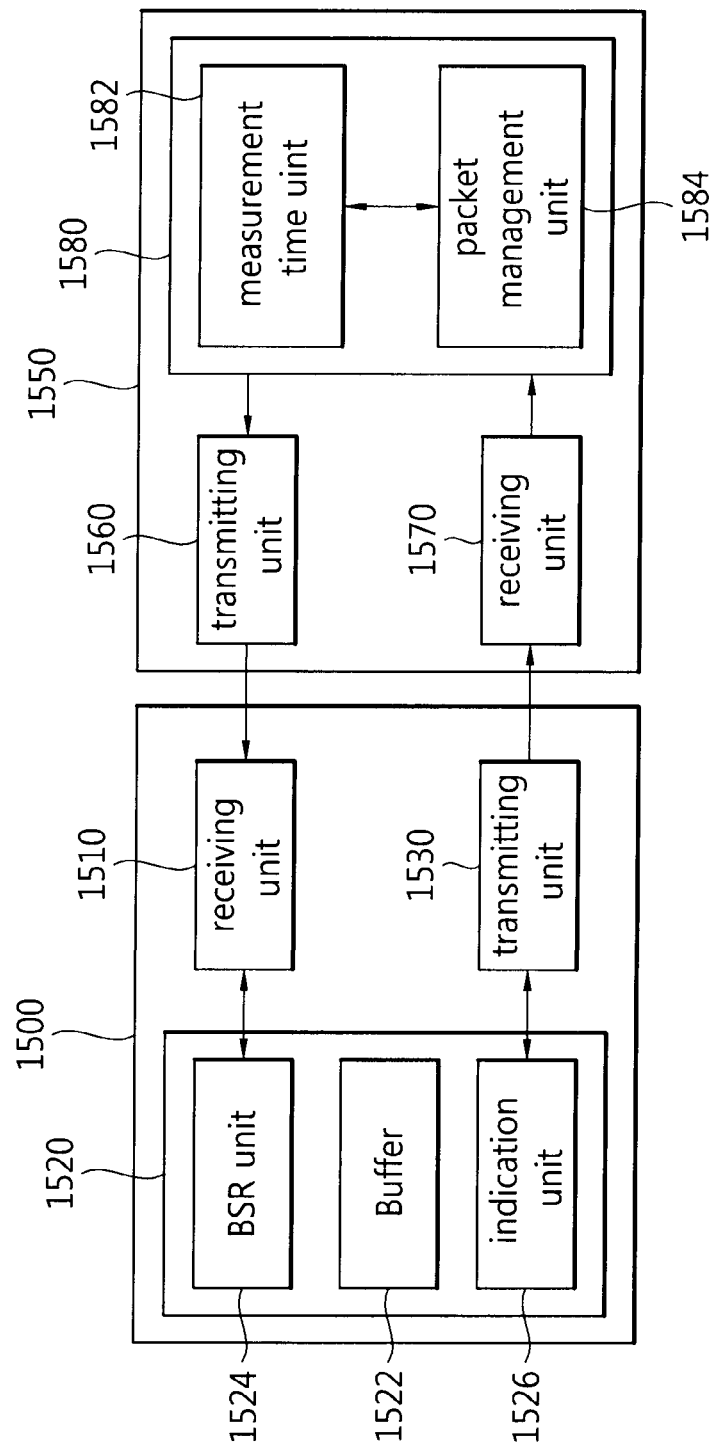
FIG. 15 is a block diagram showing a wireless communication system according to an embodiment of the present invention.

FIG. 15 is a block diagram schematically illustrating the configuration of a transmitter and a receiver according to an embodiment of the present invention. For example, the transmitter can be a UE and the receiver can be an eNB in uplink transmission.

Referring to FIG. 15, the transmitter 1500 includes a receiving unit 1510, a transmitting unit 1530, and a data burst managing unit 1520.

The receiving unit 1510 receives an RRC message from the base station. The RRC message may include configuration information for BSR transmission or control information for transmitting a data burst indication message. By way of, the periodicBSR-Timer/retxBSR-Timer/retxBSR-Timer/extendedBSR/mapping information of logical channel to logical channel group for BSR reporting for the BSR transmission or for transmission of the data burst indication message or configuration information of the indication message or information on, e.g., format or type for the message may be included.

The data burst managing unit 1520 may include a buffer 1522, a BSR(generating) unit 1524, and an Indication(generating) unit 1526.

Firstly, the BSR unit(1524) triggers a BSR to indicate burst data start to receiver when the BSR value is changed from 0 to a certain value by checking a size of the buffer (1522). The BSR unit (1524) triggers a BSR to indicate burst data end when the BSR value is changed from a certain value to 0 by checking a size of the buffer(1522). Herein the value of a BSR can be evaluated per LCG (Logical Channel Group). It means that the above operation can be applied to a LCG not to a UE. The BSR unit (1524) can trigger a BSR when a BSR value of a LCG is changed from 0 to a certain value to indicate data burst start. The BSR unit (1524) can trigger a BSR when a BSR value of a LCG is changed from a certain value to 0 to indicate data burst end.

Whereas, the Indication unit (1526) indicates to the receiver(1550), the start and the end of the data burst by checking the buffer(1522). The Indication unit (1526) triggers to send a start indication to initiation of the transmission buffer when a data block is received from the upper layer.

The Indication unit (1526) triggers to send an end indication when the transmission buffer becomes empty (after the transmission of the last data block). Herein, the Indication unit (1526) controls the transmitting unit (1530) to send the start indication just before the first data block of the data burst, and sends the end indication right after the last data block of the data burst. The data block can be one of MAC PDU, MAC SDU, RLC PDU, RLC SDU, PDCP PDU, or PDCP SDU. The indication can be sent as one of MAC Control Element, RLC Control PDU, or PDCP Control PDU.

The transmitting unit 1530 transmits, to the receiver 1550, a wireless signal including an indication message or a BSR associated with the start or end of a data burst generated in the data burst managing unit 1520.

Here, the transmitting unit 1530 and the receiving unit 1510 of the transmitter may be configured in a single radio frequency (RF) unit. Further, the data burst managing unit 1520 may be provided and operated in a processor, or a processor may conduct the operation according to the present invention and may be thus referred to as the data burst managing unit 1520.

Meanwhile, the receiver 1550 may include a transmitting unit 1560, a receiving unit 1570, and a data burst throughput unit 1580.

The transmitting unit 1560 transmits an RRC message including configuration information for BSR transmission or control information necessary for transmission of an indication message in order to obtain information associated with a data burst.

The receiving unit 1570 receives a wireless signal including the indication message or BSR transmitted from the transmitter in association with the data burst. The BSR or indication message is generated based on the configuration/control information of a control message previously transmitted, and the receiving unit 1570 may identify the type of BSR or indication message through the identification information or header of the received message.

The data burst throughput unit 1580 may include a measuring time unit 1582 for identifying the time that a data burst is started or ended by identifying a received message and a packet management unit 1584 for identifying the amount of data. Herein, the measuring time unit 1582 and the packet management unit 1584 can be comprised as one processor or each functional unit to process each function as modification to extend the concept of the invention , even though these are explained each unit to help understanding in this invention.

The measurement time unit (1582) determines that a data burst starts, and sets T2 to the time When the receiver (1550) receives a BSR with value larger than 0 from the transmitter (1500) whose BSR was previously 0, it considers when the BSR (with value larger than 0) is received, or when the UL grant is allocated to the UE, or when a data block is received from the UE for the first time after the BSR is changed from 0 to certain value. Also the measurement time unit (1582) determines that a data burst ends, and sets T1 to the time when the receiver (1550) receives a BSR with value equal to 0 from the UE whose BSR was previously larger than 0, it considers when the BSR (with value equal to 0) is received, or when the last data block is received before the reception of the BSR with 0.

Whereas, the measurement time unit (1582) sets T2 to the time when the receiver receives a start indication or sets Ti to the time when the receiver receives an end indication. Hererin, The transmitter(1500) can transmit the same indication multiple times to increase the robustness. When the receiver receives the same indication multiple times, the receiver applies T2 or T1 to the first time the start or end indication is received.

The measurement time unit (1582) decides a measurement period of the transmission for the data burst, i.e. ThpTimeUL, as T1-T2.

The packet management unit (1584) calculates the throughput of the data burst as volume of successfully received PDCP SDUs during the measurement period as ThpTimeUL.

Accordingly, the data burst throughput unit 1580 provides the calculated throughput to a higher network that the calculated throughput is used as a parameter for efficiently managing wireless resources or as a verification parameter for verifying the service quality. Here, the transmitting unit 1560 and the receiving unit 1570 of the receiver may be configured in a single radio frequency (RF) unit. Further, the data burst throughput unit 1580 may be provided and operated in a processor or a processor may perform an operation according to the present invention and may thus be referred to as the data burst managing unit 1520.

As explained, the receiver 1550 may determine the start time T2 and the end time T1 for data burst in UL clearly, by estimating the change of the UE buffer size as the transmitter 1500 in the UL using the BSR report or the indication from the transmitter 1500. Herein, the BSR value can be evaluated per LCG (Logical Channel Group) in this invention, the receiver 1550 determines a BSR of a LCG with value greater than 0 for at least one E-RAB of the UE, whose BSR of the LCG was previously 0 for all E-RABs of the UE, using the BSR, it considers that a data burst starts, it time, and sets T2 to the start time. The receiver 1550 also determines a BSR of a LCG with value equal to 0 for all E-RABs of the UE, whose BSR of the LCG was previously greater than 0 for at least one E-RAB of the UE, it considers that a data burst ends, and sets T1 to the end time, here, the end time includes the point in time when the transmission are successfully completed in a corresponding layer for the data.

So the receiver 1550 can determine the measurement period for the data burst using the T2 and T1 determined by the measurement time unit (1582). Finally, the receiver 1550 can estimate the UL IP throughput more clearly by calculating the data volume received during the measurement period defined more clearly.

Figure 16:
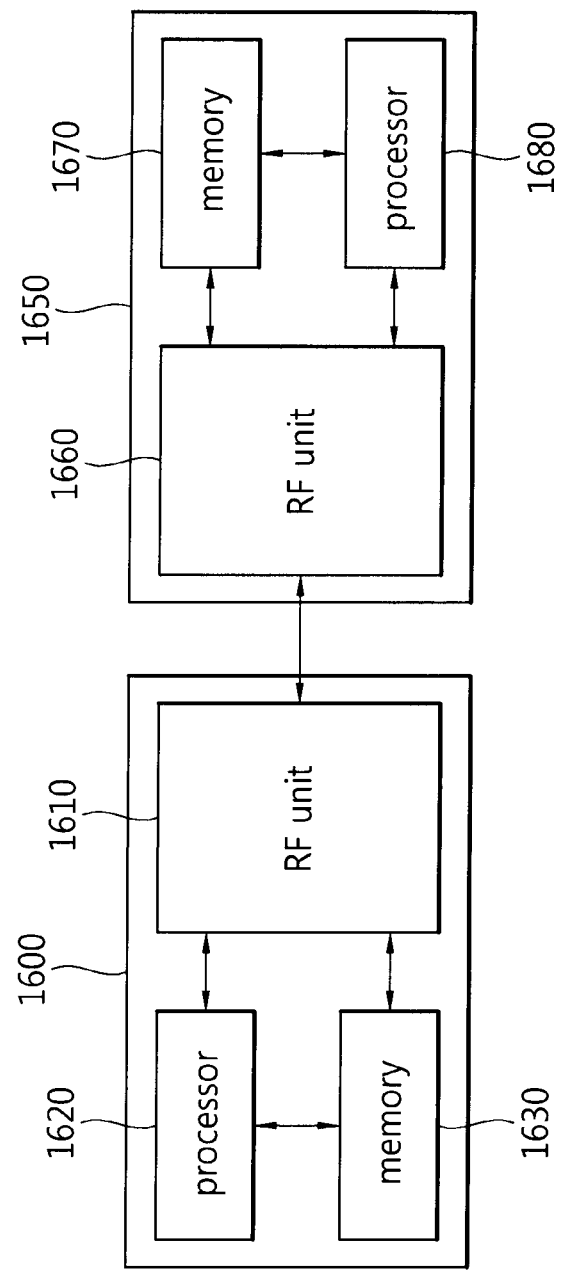
FIG. 16 is a block diagram showing a wireless communication system according to another embodiment of the present invention.

FIG. 16 is a block diagram showing a wireless communication system according to an embodiment for another aspect of the present invention.

A wireless device 1600 includes an RF unit 1610, a processor 1620, and a memory 1630. The RF unit 1610 is coupled to the processor 1620, and transmits and/or receives a radio signal. The processor 1620 implements the proposed functions, procedures, and/or methods. In the embodiments of the FIG. 4 to FIG. 15, the operation of the UE can be implemented by the processor 1620. The memory 1630 is coupled to the processor 1620, and stores a variety of information for driving the processor 1620.

A BS 1650 includes an RF unit 1660, a processor 1680, and a memory 1670. The RF unit 1660 is coupled to the processor 1680, and transmits and/or receives a radio signal. The processor 1680 implements the proposed functions, procedures, and/or methods. In the embodiments of FIG. 4 to FIG. 15, the operation of the BS can be implemented by the processor 1680. The memory 1670 is coupled to the processor 1680, and stores a variety of information for driving the processor 1680.

The processor may include application-specific integrated circuit (ASIC), other chipset, logic circuit and/or data processing device. The memory may include read-only memory (ROM), random access memory (RAM), flash memory, memory card, storage medium and/or other storage device. The RF unit may include baseband circuitry to process radio frequency signals. When the embodiments are implemented in software, the techniques described herein can be implemented with modules (e.g., procedures, functions, and so on) that perform the functions described herein. The modules can be stored in memory and executed by processor. The memory can be implemented within the processor or external to the processor in which case those can be communicatively coupled to the processor via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method of measuring a throughput in a wireless communication system, the method comprising:
   determining, by a base station, a start point (T2) at which a data burst begins, wherein the start point (T2) is a point in time when a first transmission begins after the base station estimates that a user equipment's buffer size becomes greater than zero;
   determining, by the base station, an end point (T1) at which the data burst ends;
   determining, by the base station, a data volume counted on a Packet Data Convergence Protocol (PDCP) service data unit (SDU) bits in uplink for the data burst excluding data transmitted in a last Transmission Time Interval (TTI) used for transmission of the data burst; and
   measuring, by the base station, a scheduled IP throughput of the data burst for Minimization of Drive Test (MDT) by using the start point (T2), the end point (T1), and the data volume.

2. The method of claim 1, wherein the start point (T2) is a point in time when a first transmission begins after the base station estimates that the user equipment's buffer size becomes greater than zero for a radio bearer of the user equipment.

3. The method of claim 2, wherein the end point (T1) is a point in time when the base station estimates that the user equipment's buffer size becomes zero for a radio bearer of the user equipment.

4. The method of claim 1, wherein the scheduled IP throughput of the data burst is measured by following equation:

$$\text{If } \sum ThpTimeUl > 0, \quad \frac{\sum ThpVolUl}{\sum ThpTimeUl} \times 1000 \text{[kbits/s]} \quad \langle\text{Equation}\rangle$$

$$\text{If } \sum ThpTimeUl = 0, \quad 0 \text{ [kbits/s]}$$

where ThpTimeUl=T1-T2,
ThpVolUl is the data volume.

5. The method of claim 1, wherein the PDCP SDU bits are received in a Medium Access Control (MAC) upper service access point.

6. A base station for performing a measurement of a throughput in a wireless communication system, the base station comprising:
   a radio frequency(RF) unit for receiving a radio signal; and
   a processor, operatively coupled with the RF unit, configured to:
   determine a start point (T2) at which a data burst begins, wherein the start point (T2) is a point in time when a first transmission begins after the base station estimates that a user equipment's buffer size becomes greater than zero;
   determine an end point (T1) at which the data burst ends;
   determine a data volume counted on a Packet Data Convergence Protocol (PDCP) service data unit (SDU) bits in uplink for the data burst excluding data transmitted in a last Transmission Time Interval (TTI) used for transmission of the data burst; and
   measuring a scheduled IP throughput of the data burst for Minimization of Drive Test (MDT) by using the start point (T2), the end point (T1), and the data volume.

7. The base station of claim 6, wherein the start point (T2) is a point in time when a first transmission begins after the base station estimates that the user equipment's buffer size becomes greater than zero for a radio bearer of the user equipment.

8. The base station of claim 7, wherein the end point (T1) is a point in time when the base station estimates that the user equipment's buffer size becomes zero for a radio bearer of the user equipment.

9. The base station of claim 6, wherein the scheduled IP throughput of the data burst is measured by following equation:

$$\text{If } \sum ThpTimeUl > 0, \quad \frac{\sum ThpVolUl}{\sum ThpTimeUl} \times 1000 \text{[kbits/s]} \quad \langle\text{Equation}\rangle$$

$$\text{If } \sum ThpTimeUl = 0, \quad 0 \text{ [kbits/s]}$$

where ThpTimeUl=T1-T2,
ThpVolUl is the data volume.

10. The base station of claim 6, wherein the PDCP SDU bits are received in a Medium Access Control (MAC) upper service access point.

* * * * *